Figure 1:
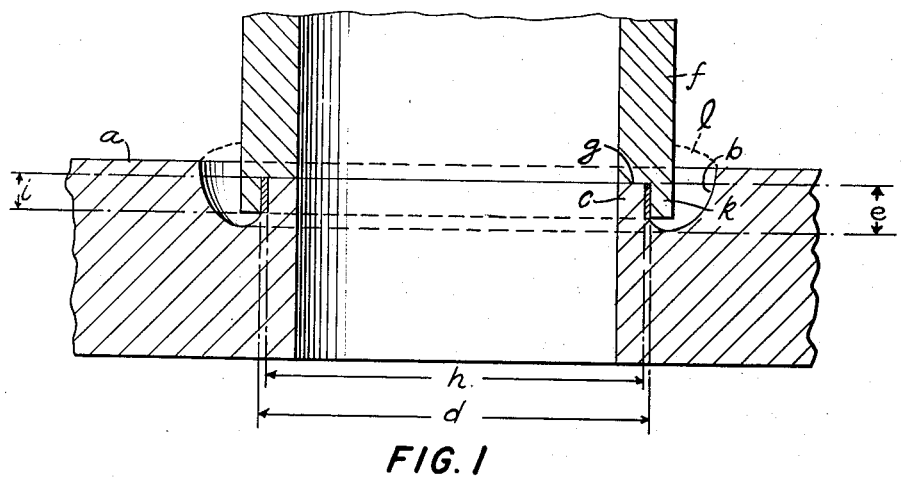

Jan. 6, 1959 H. HOVELMANN 2,867,036
METHOD FOR WELDING TUBE NIPPLES
Filed May 20, 1955 2 Sheets-Sheet 1

INVENTOR
H. HÖVELMANN
BY
ATTORNEYS

Jan. 6, 1959  H. HOVELMANN  2,867,036
METHOD FOR WELDING TUBE NIPPLES
Filed May 20, 1955  2 Sheets-Sheet 2

INVENTOR
H. HÖVELMANN

BY
ATTORNEYS

United States Patent Office 2,867,036
Patented Jan. 6, 1959

2,867,036

METHOD FOR WELDING TUBE NIPPLES

Heinrich Hovelmann, Koln-Dellbruck, Germany, assignor to Walther & Cie, A. G., Koln-Dellbruck, Germany Application May 20, 1955, Serial No. 516,301
In Germany January 20, 1950

Public Law 619, August 23, 1954

Patent expires January 20, 1970

3 Claims. (Cl. 29—471.7)

The present invention relates to a method for welding tube nipples to round or angular chambers of steam boilers or other vessels adapted to be subjected to pressure.

The primary object of this invention is to provide a method of welding the nipples to the surface of chambers which insures an adequate joint between the nipple and the chamber and which effects this joint in an expeditious manner.

The production of tube nipples, that is, the joining of the same to boiler chambers and the like, has previously been effected in many different manners. For example, it has been known to machine the tube nipples from a large block which in itself was to constitute part of the pressure chamber. This type of production required a large expenditure of material and time, and additionally involved the disadvantage of interrupting the natural fiber of the roller material and to a high degree reduced the qualities of rigidity of the nipple. Another method consists in pressing out the nipple from the interior of the chamber or vessel by mechanical or hydraulic means so that the chamber wall is deformed into the nipple extension. Although this method saves material and time and is free of objection as regards the qualities of rigidity of the nipple, it does involve the disadvantage of subjecting the pressed out tube nipples to hazards, particularly where it is necessary to fasten many such nipples to a chamber. Such hazards are the possibility of tearing the nipple extension or, if the pressing out tool is not positioned properly, a slanting pressure will originate during the pressing out operation which will make the tool unfit for further use due to non-uniform heating, or the slanting pressure produced by error might crack the material.

The immediately aforementioned type of production has generally been abandoned, and the tube nipples were produced separately and welded to the chamber. In effecting the joint between nipples and chamber many different procedures have been applied. One consists in providing the end of the nipple and the aperture in the chamber with threads and welding the nipple and chamber surface together by a throat or annular seam which, in this case, is regarded as a tight weld. An additional method consists in providing an upset portion at one end of the nipple which fits into a recess on the inner side of the chamber. The nipple is inserted from the interior and passed through the aperture and then welded to the outside of the chamber by an annular seam. The upset portion on the interior of the chamber is supposed, in this instance, to counteract the pushing forces applied axially of the nipple while the annular seam on the exterior of the chamber is to be regarded chiefly as a tight weld.

A further construction is utilized which consists in inserting one end of the nipple into a socket on the outer surface of the chamber, that is, into an annular recess surrounding the opening, this recess having a diameter corresponding to the outer diameter of the tube nipple and is of slight depth since it is to function only for centering the nipple. The tube nipple and chamber surface are then welded together electrically, with the welding seam serving as a tightening and a rigidifying seam.

In the first two of the last discussed methods, a homogeneous joint between the nipple and the surface of the chamber is achieved only by the annular seam which serves as a tight weld while there is no joint between nipple and chamber within the body of the chamber material. As a result, the medium within the chamber, which is under pressure, has an opportunity of penetrating between the wall of the nipple and the adjacent surface of the chamber and to thus subject parts to damage by corrosion. It thus follows that the thread or shoulder on the nipple loses its rigidifying support so that the point of fixation of nipple to chamber surface is shifted to the wall joint per se which thus is overstressed and in the course of time and by being subjected to continuing stress is ruptured.

In the last mentioned method in which a recess or shoulder is formed in the surface of the chamber around the aperture therethrough, the aforegoing disadvantage is considerably reduced. However, there still remains a contact surface between the base or end face of the nipple and the shoulder formed on the chamber surface in which there is no weld joint present and no adequate seal, so that there is a possibility of the medium under pressure penetrating between these surfaces. Thus, so-called notch effects can occur which under continued stress will lead to more series damage.

Accordingly, it is a particular object of the present invention to provide a method of welding tube nipples to the surface of round or angular chambers of steam boilers and other vessels subjected to pressure which eliminates the disadvantages attendant with the prior known methods of production.

It is a specific object of the present invention to provide a method of welding nipples to the apertured surfaces of vessels adapted to be subjected to interior pressure which includes the provision of a recess in the outer surface of the chamber portion and surrounding the aperture therethrough and which annular recess includes an outer portion of increased depth so as to provide an annular ring surrounding the aperture but disposed beneath the level of the outer surface. The tube nipple is provided with an internal shoulder adapted to be engaged by the aforementioned ring when the nipple is inserted in the recess so that the nipple is centered, following which the nipple is welded to the chamber surface by an effective weld joint which exists between the end face of the nipple and the underlying surface of the deeper portion of the recess and between the outer periphery of the end of the nipple and the inner periphery of the recess.

In a still more particular object, the outer diameter of the annular ring formed on the chamber surface is so dimensioned with respect to the diameter of the shoulder formed on the end of the nipple that the nipple after heating can be pushed onto the annular ring of the chamber surface so that upon cooling shrinking stresses originate which are borne chiefly by the annular ring on the chamber surface. In welding the nipple to the chamber this annular ring is subjected to heat and the stress forces inherent therein cause a pressure welding of the ring on the nipple to the annular ring on the chamber whereby a homogeneous joint is provided between the ring on the chamber and the ring formed on the nipple.

Further, in accordance with this invention, it is a still more specific object to form the shoulder on the end of the nipple to a depth less than the height of the outwardly protruding annular ring formed on the chamber surface so that the annular portion of the ring outwardly of the shoulder is spaced from the base of the deeper portion of the recess. Thus, when the nipple that is to be joined is pressed in heated condition against the chamber ring and if this pressure is maintained during welding the welding arc heats the annular portion of the end of the nipple that is outwardly of the shoulder from below and causes it to melt. In this fashion the contact surface between the annular ring formed on the chamber surface and the annular portion of the end of the nipple is homogeneously joined by pressure welding. In order to provide for this pressure welding action the depth of the recess or shoulder formed on the end of the nipple is less than the height or extent of the recess formed on the outer surface of the chamber material. The advantages of this invention consist chiefly in the fact that the lower end surface of the nipple and the surface of the annular ring formed in the chamber material form a homogeneous joint so that, in contrast to the known methods, all joint faces are welded together. An additional advantage resides in the fact that following the present method any fastening of the nipple to the chamber surface prior to welding may be omitted since the shrink fit provided between the nipple and the annular ring surrounding the aperture in the chamber surface attained by pressing the heated nipple onto this annular ring provides a sufficient centering and fastening and thereby eliminates any possibility of positioning the nipple in a slant-wise position relative to the axis of the aperture through the chamber material.

The basic principles of this invention, that is, the joining of tube nipples to the wall surfaces can be subjected to variations. Thus it is possible to refrain from utilizing the step of shrink fitting the shouldered nipple onto the ring formed on the base material. However, if shrink fitting is eliminated, it is necessary to provide some means of what can be termed preliminarily coupling the tube with the base material. Thus the invention contemplates an arrangement in which the cylindrical exterior surface of the ring formed on the base and the facing inner surface of the protuberance formed on the end of the nipple outward of the shoulder can be dimensioned such that the parts are telescoped one over the other. In doing this, however, care must be exercised that clearance space be avoided since with undue clearance the weld joint is not as strong as possible. Thus to overcome this disadvantage, the invention contemplates forming these facing cylindrical surfaces as conical or tapering surfaces so that when the tube nipple is applied to the ring formed in the base material there will be a proper fitting of the parts together.

Thus the invention contemplates proper preliminary union of the tube nipple with the base prior to welding.

A further feature of this invention consists in dimensioning the wall thickness of the protruding end of the nipple as not more than 1.5 mm. so that this portion of the nipple is melted down during the welding step and thus completely merges with the welding seam. In so dimensioning the wall thickness of the protruding end of the nipple, the shoulder or face of the nipple that lies perpendicular to the axis of the aperture through the base material and which face is pressed by axial pressure directly upon the top surface of the ring formed on the base is merged into the weld seam. Due to the temperature of the arc in welding and the thinness of the protruding ring on the nipple, the parts of the nipple that extend horizontally and are subjected to axial pressure merge into the weld seam so that at the inner face of the joint between nipple and ring on the base a slight protuberance originates. This protuberance in the welding zone does not cause any difficulty and has the advantage of indicating, during the welding operation, that a proper and closed welding seam has been formed. Experience has demonstrated that the facing surfaces of the ring and nipple which lie perpendicular to the axis of the aperture should not amount to substantially more than 3 mm. in order that a complete weld be effected.

The above mentioned dimensions of 1.5 or 3 mm. respectively are dependent however on the materials utilized, particularly on the composition and type of electrode and the quantity of heat conducted thereby into the welding zone.

If in certain instances nipples are utilized having dimensions, that is wall thicknesses at the shouldered ends, that amount to substantially more than 4.5 mm., it is expedient, as a further improvement of this invention, to reduce the lower part, that is the shouldered end of the nipple, to the required maximum dimension of 4.5 mm. in wall thickness. This reduction can be effected by grinding or turning with slow transitions. In this connection, extent of the transition in which the wall thickness of the nipple is reduced must not project substantially from the welding zone in order that the reduction of wall thickness is compensated for by the welding seam.

Figure 2:
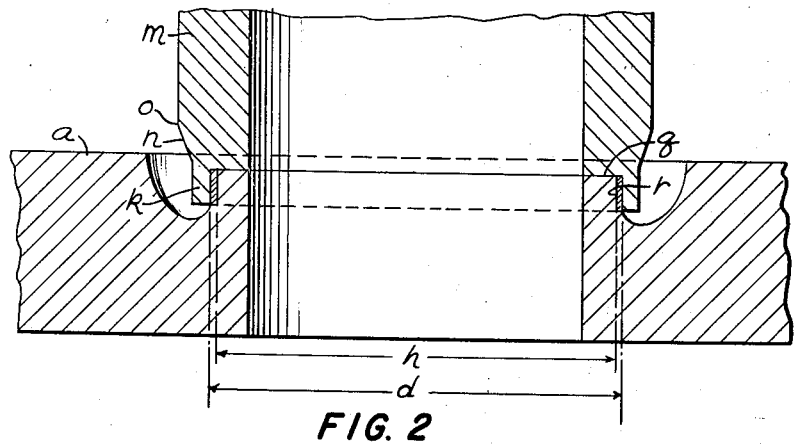
Figure 3:
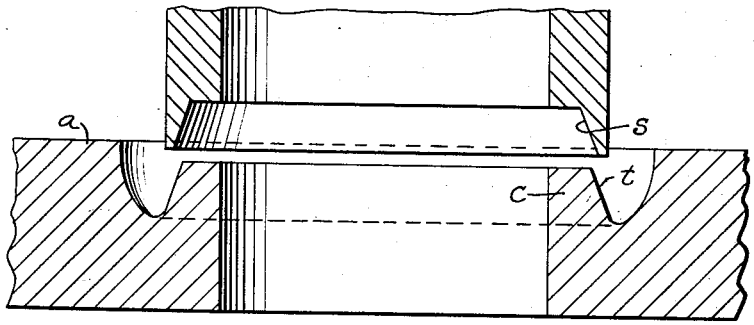
Figure 4:
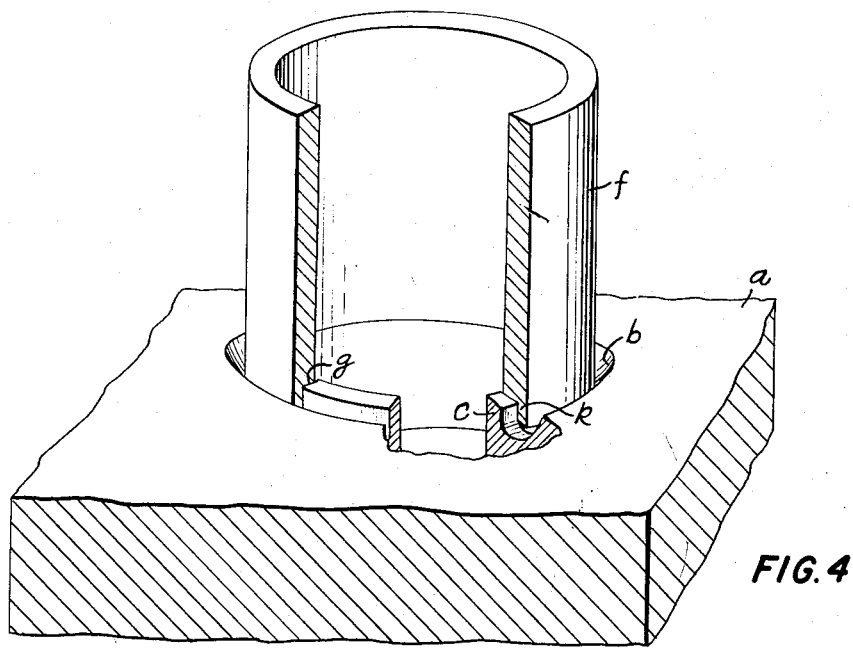
Figure 5:
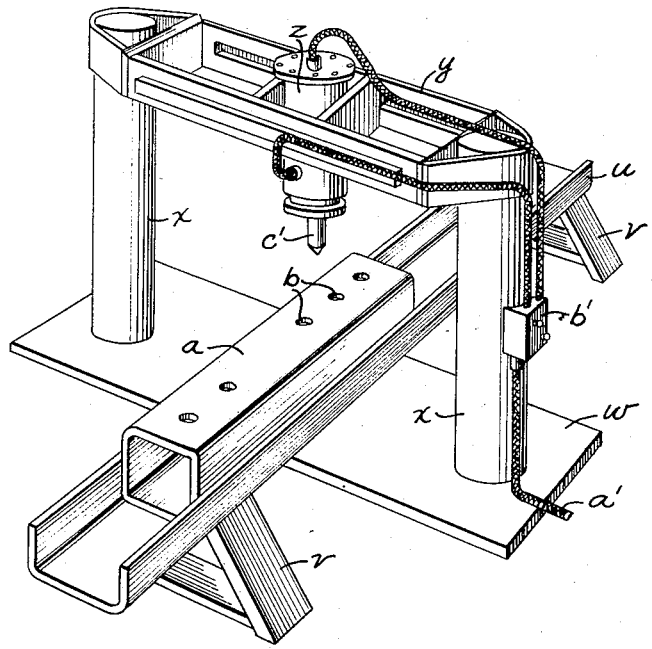

Further and more specific objects of the invention will be apparent from the following description taken in connection with the accompanying drawings, in which:

Figure 1 is a fragmentary view illustrating the invention in longitudinal cross section and showing the connection of a tube nipple with the base material of a chamber, Figure 2 illustrates a modified form of joint with special dimensions for the ring on the base material and the protruding end of the nipple and also illustrates the reduction of wall thickness, Figure 3 is a view illustrating a modified form of connection which eliminates the step of shrink fitting the nipple onto the ring formed on the base material, Figure 4 is a fragmentary perspective view of a joint according to Figure 1, and Figure 5 is a diagrammatic perspective view of a fixture utilized in producing the welding joint in accordance with this invention.

In the drawings, reference character $b$ denotes what can be termed a tulip-shaped recess which is milled out of the outer surface of the wall of the chamber. As shown, the recess is so formed as to leave at its root an annular projection $c$ having a height $e$ and an outer diameter $d$. The tube nipple $f$ is formed at the end to be joined by welding an annular depression or shoulder $g$ having a diameter $h$ and a height $i$. As indicated, the outer diameter $d$ of the annular projection or ring $c$ is larger than that of the annular depression $g$ in the nipple so that the nipple can be pushed over the annular projection on ring $c$ only in heated condition and then firmly sits thereon by shrinking. In other words, the nipple is shrunk fit onto the annular ring $c$. The radial shrinking stresses are transmitted to the annular projecting portion on ring $k$ at the end of the nipple which stresses upon the application of the welding seam $l$ cause the nipple to be pressure welded to the chamber material. The axial pressure is borne by the top surface of the annular ring $c$ so that upon heating by the electric welding arc a pressure weld is effected between the base of the shoulder $g$ and the top of the ring $c$.

The method can be applied to round chambers as well as angular chambers on any vessel that is to be subjected to internal pressure and is to have nipples secured thereto. It is a matter of choice as to whether the nipples have small or large diameters or thick or thin walls as long as there is sufficient thickness to form the internal shoulder on the end of the nipple that is to be welded to the chamber. Thus it is clear that the present invention provides a method of joining a tube to an apertured base which includes the step of forming a recess in the base having portions of different depth so as to provide an annular outwardly projecting ring surrounding the aperture through the base and which ring has a planar top surface lying below the outer surface of the base and with a recess having its annular portion outwardly of the ring of greater depth and width than the ring. The method further comprises forming an annular internal shoulder on the end of the tube nipple so as to provide an annular depression at the end of the nipple having its internal diameter less than the outer diameter of the ring on the base and having an axial extent less than the height of the ring, subjecting the end of the nipple to heat and applying it to the ring on the base by a shrink fit following the pushing on of the end of the nipple to the ring after it is heated, and finally providing a weld seam in the recess in the base and between the top surface of the base and the adjacent portion of the outer periphery of the nipple while subjecting the nipple to axial pressure to provide a pressure weld between the contacting faces of nipple and annular ring on the base.

In further reference to the drawings, Figure 2 illustrates an arrangement in which the wall thickness $m$ is greater than 4.5 mm. The wall thickness is therefore reduced at $n$ until it attains a wall thickness of 4.5 mm. In this connection, the reduction is tapered and the length $o$ of the taper as at $n$ must not extend substantially beyond the correspondingly designated portion $o$ of the part $m$ in order that the material removed by the taper is not replaced by a welding material, which, if desired, is filled up by the electrode. Accordingly, the thickness of the annular projection $k$ at the end of the nipple is dimensioned as 1.5 mm. and for the supporting surface $q$ a width of a maximum of 3 mm.

In the arrangement of Figure 3, a cylindrical inner wall $r$ of the form of Figure 2 is replaced by the formation of a conical inner wall $s$. The ring $c$ formed on the base has a correspondingly conically shaped wall surface $t$. With this modification in the facing surfaces of ring and nipple end, it is not necessary to provide a shrink fitting, it being sufficient to subject the nipple to axial pressure during welding.

Figure 4 illustrates more clearly the improved connection resulting from the steps of the novel method described for Fig. 1.

Figure 5 illustrates the chamber $a$, that is the base material is mounted for longitudinal sliding movement on the roller track $u$. The roller track is incorporated in a U-shaped chute adapted to the shaping of chamber $a$ and supported by supporting feet $v$. Surrounding the chute is a structure comprising a base plate $w$, upright standards $x$ and a cross beam $y$. A cylinder means $z$ is carried by a frame structure that is horizontally slidably mounted on the cross beam $y$. Compressed air controlled by a valve $b'$ is supplied through conduit $a'$ to the cylinder means so that a pressure applying member $c'$ is forced outwardly of the cylinder to apply pressure to a tube nipple, not shown, to press the same into the recess $b$ formed in the chamber $a$. The pressure is adjusted to apply a load of about 15 kgs. per mm.² upon the superimposed surfaces of nipple and chamber material.

Obviously numerous variations and modifications of the instant invention are possible in the light of the above teachings Accordingly it is to be understood that within the scope of the appended claims the invention may be practiced otherwise than as specifically described herein.

What is claimed is:

1. A method of welding a metallic tube nipple to an apertured metallic base comprising the steps of forming a recess in one surface of the base about the aperture to provide a projection between the recess and aperture on the base, forming an internal shoulder at a predetermined axial distance from the end of the tube nipple to be joined, inserting said projection into said end of the tube nipple, and fusion depositing weld metal into the recess while heating the metal of the projection and the shoulder to a pressure welding temperature and applying sufficient axial pressure to the tube nipple to cause the upper surface of the projection to be pressure welded to the lower face of the shoulder at that temperature.

2. A method of welding a metallic tube nipple to an apertured metallic base comprising the steps of forming an annular groove in one surface of the base about the aperture to provide a ring of a predetermined height between the groove and aperture on the base, forming an internal annular depression at the end of the tube nipple to be joined of a diameter less than the outer diameter, heating said end of the tube nipple, inserting said ring into said end, and of an axial extent less than the height, of the ring on the base, and fusion depositing weld metal into the groove while heating the metal of the ring and the end of the tube nipple to a pressure welding temperature and applying sufficient axial pressure to the tube nipple to cause the upper face of the ring to be pressure welded to the transverse surface of the depression.

3. A method of welding a metallic tube nipple to an apertured metallic base comprising the steps of forming an arcuate shaped groove in one surface of the base to provide a ring having a tapering outer surface between the aperture and the groove, forming a frusto-conical inner wall on the end portion of the tube nipple to be joined to the base, frictionally fitting the inner wall about the ring, and fusion depositing weld metal into the groove while heating the metal of the ring and the end of the tube nipple to a pressure welding temperature and applying axial pressure to the tube nipple.

References Cited in the file of this patent

UNITED STATES PATENTS

| | | |
|---|---|---|
| 1,736,610 | Loffler | Nov. 19, 1929 |
| 1,772,273 | Williams | Aug. 5, 1930 |
| 2,128,111 | Woods et al. | Aug. 23, 1934 |
| 2,034,808 | Graham | Mar. 24, 1936 |
| 2,221,934 | Ferris | Nov. 19, 1940 |
| 2,243,402 | Trainer et al. | May 27, 1941 |
| 2,361,636 | Koppel | Oct. 31, 1944 |